United States Patent [19]
Calarco et al.

[11] Patent Number: 5,237,432
[45] Date of Patent: Aug. 17, 1993

[54] IMAGE SCALING APPARATUS

[75] Inventors: Anthony F. Calarco, Fairport; Ying-wei Lin, Penfield; Leon C. Williams, Walworth, all of N.Y.

[73] Assignee: Xerox Corporation, Stamford, Conn.

[21] Appl. No.: 812,334

[22] Filed: Dec. 23, 1991

[51] Int. Cl.$^5$ .............................................. G06F 15/20
[52] U.S. Cl. ...................................... 358/451; 358/426
[58] Field of Search .................. 358/451, 426, 77; 355/243, 266; 364/577, 581, 582, 737, 745, 746

[56] References Cited

U.S. PATENT DOCUMENTS

| | | | |
|---|---|---|---|
| 4,275,450 | 6/1981 | Potter | 364/515 |
| 4,587,621 | 5/1986 | DuVall | 364/577 |
| 4,742,553 | 5/1988 | Irwin | 382/47 |
| 4,809,083 | 2/1989 | Nagano et al. | 358/287 |
| 4,811,115 | 3/1989 | Lin et al. | 358/283 |
| 4,897,803 | 1/1990 | Calarco et al. | 364/518 |
| 4,901,258 | 2/1990 | Akiyama | 364/577 |
| 4,918,542 | 2/1991 | Nagashima et al. | 358/451 |
| 5,008,752 | 4/1991 | Van Nostrand | 358/160 |
| 5,025,405 | 6/1991 | Swanson | 364/723 |

FOREIGN PATENT DOCUMENTS

WO91/01527  2/1991  PCT Int'l Appl.

*Primary Examiner*—Stephen Brinich
*Attorney, Agent, or Firm*—Duane C. Basch

[57] ABSTRACT

An image processing system for altering the size of an image represented by a plurality of input video signals including a controller for producing a scale factor and a scale factor valid signal. The controller also includes a padder which is used to increase the accuracy of the scale factor during the operation of the controller. The signals generated by the controller are passed to an interpolator suitable for producing an output signal as a function of one or more of the input video signals in response to the scale factor and scale factor valid signal.

16 Claims, 6 Drawing Sheets

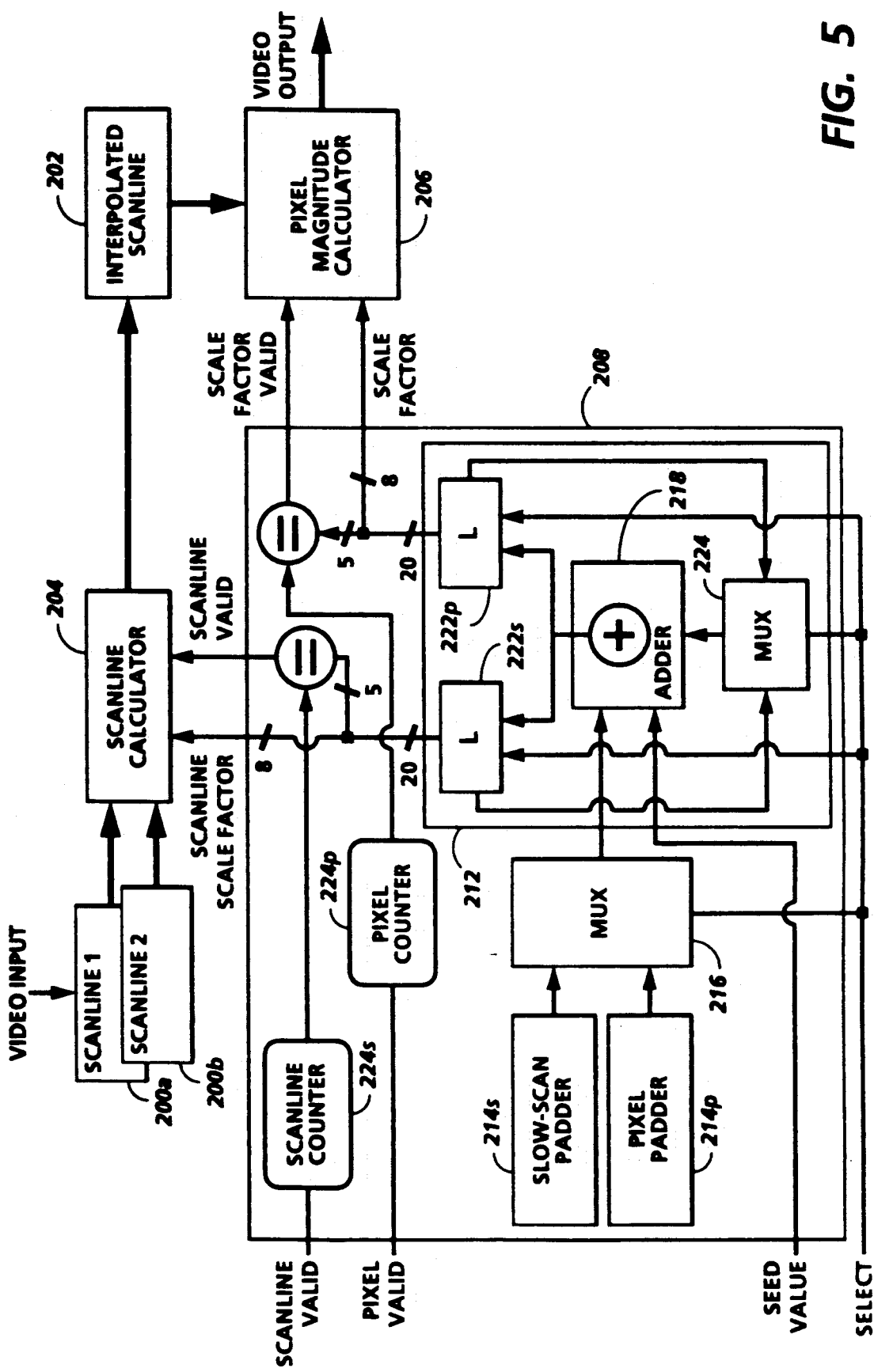

IMAGE SCALING APPARATUS

This invention relates generally to a digital signal processing apparatus, and more particularly to an apparatus for scaling an array of digital image signals.

CROSS REFERENCE

The following related applications and patents are hereby incorporated by reference for their teachings:

"Improved Automatic image Segmentation," Shiau et al., Ser. No. 07/722,568, filed Jun. 27, 1991;

"Method and Apparatus for Controlling the Processing of Digital Image Signals," Williams et al., Ser. No. 07/809,807, filed Dec. 18, 1991;

"Method and Apparatus for Implementing Two-dimensional Digital Filters," Clingerman et al., Ser. No. 07/809,897, filed Dec. 18, 1991;

U.S. Pat. No. A-4,811,115 to Lin et al., issued Mar. 7, 1989; and U.S. Pat. No. A-4,897,803 to Calarco et al., issued Jan. 30, 1990.

BACKGROUND OF THE INVENTION

The features of the present invention may be used in the printing arts and, more particularly, in digital image processing and electrophotographic printing. In digital image processing, there is a distinct advantage to being able to electronically magnify or reduce the digital data coincident with the actual scanning of the document. Generally, the advantage is manifest in the ability to run the video capture and processing hardware at a predetermined video rate up to the image scaling circuitry and thereafter increasing or decreasing the video rate. Hence, the hardware may be designed for a specific operating speed, without having to continuously respond to changes in signal timing or frequency. In addition, any increased data rates due to a magnification of the video signals, are delayed as long as possible, thereby minimizing the need for faster and typically more expensive digital components. Accordingly, the present invention provides a digital image scaling apparatus that may be used to provide real-time scaling of image signals while a document is being scanned.

While the desirability of electronic scaling may be apparent, few techniques, if any, operate without incurring some loss in the accuracy of the output or scaled image signals, or a severe degradation in the rates at which the signals are processed. The loss of accuracy generally occurs in two ways. The first is through the mathematical error introduced when a fractional value is represented using a binary value of limited size. For example, representing the fractional value of one-fifth with only three binary digits would require "rounding" the fraction to the nearest eighth, or 0.250, thereby introducing significant error. The second way error occurs is through the generation of a modified video signal when, in actuality, an input video signal should have simple been passed through the system to produce the output signal. In other words, the image scaling system failed to recognize an input image signal that correspond exactly with the position of an output image signal and, therefore, should have passed the input signal directly through the system without modification.

Two of the techniques which have been proposed for image scaling include nearest-neighbor and linear interpolation. Techniques of this type have applicability across a wide range of scanning products, for example the Xerox ® 7650 Pro Imager ® and electronic reprographic systems such as the Xerox ® Docutech Production Publisher ®. The following disclosures may be relevant with regard to some of the approaches used for digital image scaling.

US-A-4,275,450
Patentee: Potter
Issued: June 23, 1981

US-A-4,587,621
Patentee: DuVall
Issued: May 6, 1986

US-A-4,742,553
Patentee: Irwin
Issued: May 3, 1988

US-A-4,809,083
Patentee: Nagano et al.
Issued: February 28, 1989

US-A-4,918,542
Patentee: Nagashima et al.
Issued: April 17, 1990

US-A-5,008,752
Patentee: Van Nostrand
Issued: April 16, 1991

US-A-5,025,405
Patentee: Swanson
Issued: June 18, 1991

WO-91/01527
Inventor: Newman
Published: February 7, 1991

The relevant portions of the foregoing patents may be briefly summarized as follows:

U.S. Pat. No. A-4,275,450 to Potter discloses a magnification/demagnification apparatus and method wherein an accumulator is used to accumulate a reduction ratio, which, when greater than a predefined threshold, signals that the image signal should be passed on. Otherwise, the image signal is deleted and an additive reset count is added to the accumulator. In an alternative embodiment, an add-one circuit generates a signal which temporarily increases a magnification counter setting by one. The add-one circuit is only activated at selected times when the value in the magnification counter exceeds a threshold value.

U.S. Pat. No. A-4,587,621 to DuVall discloses a device for magnification of image signals wherein a linear interpolator is used to calculate magnification ratios. The interpolator determines a spatial relationship of output values, with respect to a pair of digital scan values, where the spacing between successive scan outputs is defined as the reciprocal of a magnification value. A hardware circuit, which accumulates a magnification value and subsequently interpolates an input image to determine if an output pixel is valid, is used. Furthermore, the accumulated value is also used as an input to a large look-up table to determine the interpolated output value.

U.S. Pat. No. A-4,742,553 to Irwin discloses a resolution conversion system for bitmap images using error term averaging, wherein an error value is added to an input value to generate an output value and a test value. An algorithm is disclosed which implements the resolution conversion and is particularly suitable for greyscale processing.

U.S. Pat. No. A-4,809,083 to Nagano et al. discloses an image recording/reading apparatus with enlarging and reducing functions, wherein a desired magnification is divided into an integer part and a decimal part. The decimal part is then used to correct an image output. Every time the accumulated decimal part is greater than one, an output pixel is deleted.

U.S. Pat. No. A-4,918,542 to Nagashima et al. discloses an image processing apparatus capable of smooth multi-area variable magnification, wherein an error term is determined by comparing a desired image magnification ratio with an actual image magnification ratio. Two counters are initially set to zero and count a number of output pixels and a number of input pixels. A signal, RDEB, stores an error term which is used to pad image output data. An algorithm is shown in FIGS. 10A, 10B, 11A, and 11B which pads an input image. The algorithm also determines if an output pixel is valid.

U.S. Pat. No. A-5,008,752 to Van Nostrand discloses an interpolator for enlarging or reducing a digital image in two dimensions, which includes row and column interpolators. Both interpolators operate so as to generate signals indicating when the next element, row, or pixel is to be retrieved. The interpolators also produce a displacement address which is used to retrieve an interpolation coefficient from a look-up table, the interpolation coefficient being used subsequently to produce the interpolated output.

U.S. Pat. No. A-5,025,405 to Swanson discloses a subsystem capable of image synthesis in a computer workstation. In general, the images to be displayed are represented by a function, wherein the values across an area, i.e., color or intensity, must be interpolated to accurately reflect the image. The system employs interpolation, based on precomputed integer and fractional portions of the function's slope, to scale the function using integer arithmetic.

WO-91/01527 by Newman discloses an interpolation system that generates an interpolated value in response to an input value. The system includes a function value store, an address generator, and an interpolator. In operation, the address generator is used to generate address signals to identify locations in the function value store, which in turn provides function values that are used in conjunction with the input value to generate the interpolated value.

The present invention seeks to overcome limitations found in the related references and commercially available products by providing an apparatus for accurately scaling the video signals of a digital image or document during the scanning or processing of the digital signals. The present invention also enables the scaling of video signals across a range of scaling ratios, without the need for large look-up tables to produce the interpolated output. Furthermore, the present invention provides the scaling functionality in a highly accurate manner using an efficient hardware implementation that minimizes memory requirements. In addition, the present invention enables the use of programmable scaling ratios, thereby increasing the flexibility of the apparatus.

In accordance with one aspect of the present invention, there is provided an improved digital image scaling apparatus having digital hardware capable of scaling the size of an image, represented by a plurality of input video signals by a desired scaling ratio, a controller for producing a scale factor, and a scale factor valid signal, where the controller includes a padder suitable for increasing the accuracy of the scale factor. The apparatus further includes an interpolator or calculator for producing an output signal as a function of one or more input video signals, in response to the scale factor and scale factor valid signal.

In accordance with another aspect of the present invention, there is provided a digital scaling apparatus suitable for scaling an orthogonally oriented array of digital image signals in two dimensions, where the array is arranged by rows of scanlines comprised of a plurality of pixels. The apparatus employs a single controller for producing both a first scale factor for use by a scanline interpolator, and a second scale factor suitable for use by a pixel interpolator. The apparatus further employs a padder suitable for supplementing the scale factor so as to increase the accuracy of the interpolated output.

Pursuant to yet another aspect of the present invention, there is provided a method for scaling an input image represented by a plurality of pixel values to produce an output image. The method beings by obtaining two successive input pixel values, $P_n$ and $P_{n+1}$. At the same general time, an arithmetic accumulation of the sum of a seed value, a previously accumulated sum, and a supplemental value is being calculated, the accumulated sum having both integer and fractional portions. Once determined, the integer portion of the accumulated sum is used to determine whether the first and second input pixel values are to be used to produce an output pixel value. If so, the accumulated sum is used to generate a scale or interpolation factor, $\alpha$, based upon the fractional portion of the accumulated sum, which, in turn, is utilized in interpolating between the first and the second pixel values to produce an output pixel value $P_{new}$, where:

$$P_{new} = P_{n+1} + \alpha(P_n - P_{n+1}).$$

The accumulation and interpolation steps are repeated until no further output pixels are to be generated from the current input pixels. At that time, the second input pixel value is shifted to become the new value for $P_n$, a new $P_{n+1}$ pixel value is obtained, and the process continues with the accumulation and interpolation steps, until all of the input pixels have been processed in a similar manner.

BRIEF DESCRIPTION OF THE DRAWINGS

FIG. 5 is a block diagram illustrating an embodiment of the present invention wherein a single interpolation apparatus is used to control scaling in two dimensions.

Figure 1:
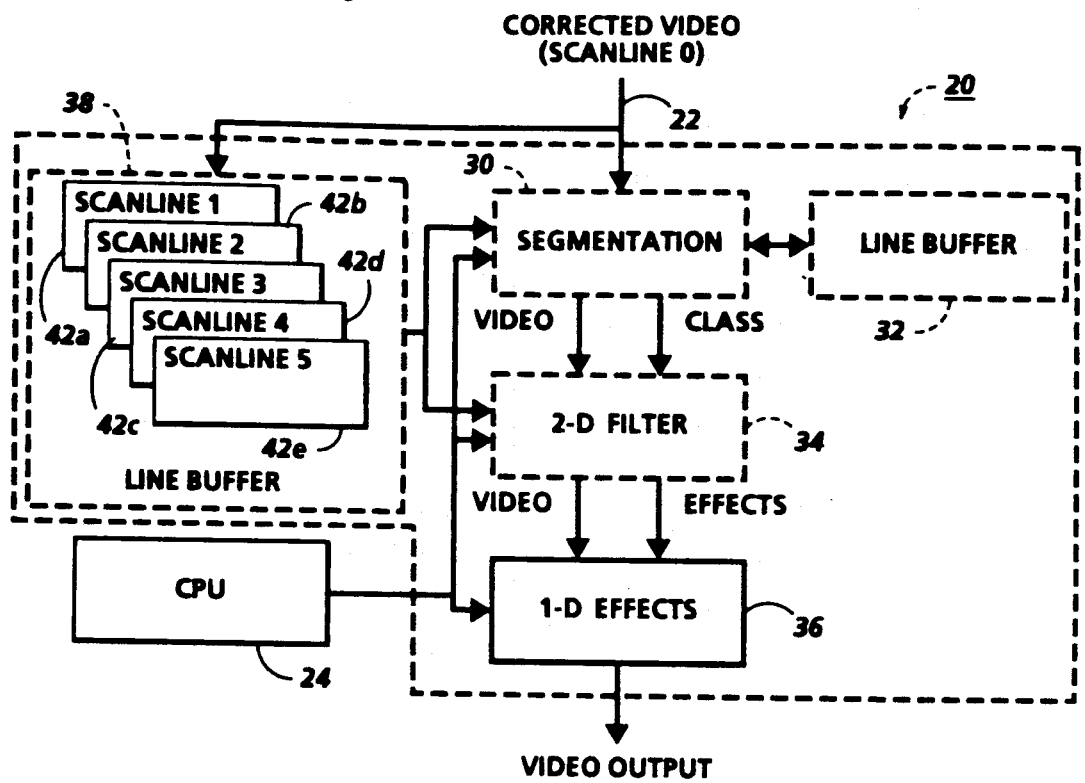
FIG. 1 is a general schematic illustration of an image processing hardware module that could provide a suitable embodiment for the present invention.

The present invention will be described in connection with numerous embodiments, however, it will be understood that there is no intent to limit the invention to those embodiments. On the contrary, the intent is to cover all alternatives, modifications, and equivalents as may be included within the spirit and scope of the invention is defined by the appended claims.

DESCRIPTION OF THE PREFERRED EMBODIMENT

The following description includes references to slow-scan and fast-scan digital image data when discussing the orientation of the window coordinates and sampled signals used by the background determination circuitry. For purposes of clarification, data collected along a fast-scan direction is intended to refer to individual pixels located in succession along a raster of image information, while data collected in the slow-scan direction refers to data derived from a common raster position across multiple rasters or scanlines. As an example, slow-scan data would be used to describe signals captured from a plurality of elements along a linear photosensitive array, as the array was moved relative to a document. On the other hand, fast-scan data would refer to the sequential signals collected along the length of the linear photosensitive array during a single exposure period, and is also commonly referred to as a raster of data.

The following description also includes references to video image signals, or pixels, which are generally digital voltage representations of the image, as provided from a suitable source. For example, the image pixels may be obtained through line by line scanning of an image bearing original by one or more photosensitive elements, such as a multiple photosite array of charge coupled devices, commonly referred to as CCD's. Line by line scanning of an image bearing original for the deviation of image data is well known and does not form a part of the present invention. Furthermore, for the purposes of the following description, it will be assumed that the video signals are digital signals or pixels that fall within a particular domain of values representing a greyscale, where the lower signal levels generally represent regions of an image having content, as opposed to background regions which will generally be reflected by high signal levels.

In the following description, the present invention will be described with respect to an embodiment in which it is used to achieve interpolated scaling of a raster, or scanline, of image signals. However, there is no intention to limit the present invention to a one-dimensional embodiment. The invention is described in this manner merely to facilitate the understanding of the operation thereof. Hence, the present invention is equally suitable for use in a two-dimensional embodiment, where the pixels, as well as the rasters, are selected and interpolated in accordance with the output of one or more interpolation apparatus, hereafter described.

The present invention implements image scaling using the technique of linear interpolation between pixels, or rasters, where a general equation describing the technique is:

$$P_{new} = \alpha P_n + \beta P_{n+1}, \quad (1)$$

where $\alpha$ and $\beta$ are scaling or interpolation factors which determine the relative weight of the actual or input pixels ($P_n$, $P_{n+1}$) which are adjacent the theoretical output pixel ($P_{new}$) position. While this general equation may be known, the present invention is directed towards an efficient manner for determination of the scaling factors, $\alpha$ and $\beta$. Moreover, the present invention further includes the ability to indicate when appropriate pixels are available for determination of the $P_{new}$ output pixel.

In order to simplify the hardware implementation of the present invention, equation (1) was simplified by using the fact that the sum of $\alpha$ and $\beta$ is equal to unity. Accordingly, the basic linear interpolation equation, equation (1), may then be simplified and rewritten as follows:

$$P_{new} = P_{n+1} + \alpha(P_n - P_{n+1}). \quad (2)$$

Implementation of linear interpolation equation (2) requires the calculation of only a single factor, $\alpha$, and the storage of only two pixel values at any one time. Scale factor $\alpha$ is a function of the magnification/reduction level, and the position of the image pixel being processed. In general, scale factor $\alpha$ is determined by first calculating a seed value, which is simply the inverse of the magnification/reduction level. For example, a 300% magnification would result in a seed value of one-third (0.333). Similarly, a 75% reduction would result in a seed value of one and one-third (1.333). In operation, the seed value is then used, or more appropriately, accumulated, to identify not only which pixels are to be used for calculation of the interpolated pixel for output, but also the relative weighting of those pixels.

The instant invention carries the implementation one step further to achieve increased accuracy in the interpolated output. Recognizing the limitations inherent in the representation of fractional values in a binary format of reasonable length, the instant invention further controls the generation of scale factor $\alpha$ and the selection of input pixels for interpolation to overcome the limitations. More specifically, the instant invention supplements or pads the accumulation of the binary fraction associated with the scale factor to more accurately generate the interpolated pixel. A simple example will illustrate the point. In Table A,

TABLE A

| INPUT PIXEL | ACCUMULATED α VALUES | | OUTPUT PIXEL | ERROR (%) |
|---|---|---|---|---|
| | fraction | 8-bit binary | | |
| IP$_0$ | 0 | 0.00000000 | OP$_0$ | 0.00 |
| | 1/3 | 0.01010101 | OP$_1$ | 0.13 |
| | 2/3 | 0.10101010 | OP$_2$ | 0.26 |
| IP$_1$ | 3/3→1 | 0.11111111 | OP$_3$ | 0.39 |
| | 4/3→1/3 | 1.01011000 | OP$_4$ | 0.52 |
| | 5/3→2/3 | 1.10101001 | OP$_5$ | 0.65 |
| IP$_2$ | 6/3→2 | 1.11111110 | OP$_6$ | 0.78 |
| | 7/3→1/3 | 10.01010011 | OP$_7$ | 0.91 |
| | 8/3→2/3 | 10.10101000 | OP$_8$ | 1.04 |
| IP$_3$ | 9/3→3 | 10.11111101 | OP$_9$ | 1.17 |
| | 10/3→1/3 | 11.01010010 | OP$_{10}$ | 1.30 |
| | 11/3→2/3 | 11.10100111 | OP$_{11}$ | 1.43 | the actual and binary fractions are illustrated for the 300% (3x) example, where input pixels, IP$_0$ through IP$_3$ would be processed to produce corresponding output pixels OP$_0$ through OP$_{11}$.

As shown, a binary fraction is limited in the precision with which it can represent a fractional value. While this may not appear to be of great importance, Table A clearly shows that the error introduced by this limitation is cumulative. Moreover, while the error is representative of the error in the accumulated α value, when the error becomes sufficiently large, there will be a noticeable impact to the values of the interpolated output pixels produced. It should also be noted that the use of more precise binary fractions (i.e. larger numbers of bits) may reduce the error accumulated at each step, but will not eliminate it completely. Moreover, additional precision achieved by adding more significant bits will result in more costly digital hardware being required to add and store the accumulated α values during processing of the video signals.

Another problem with the accumulation of the α value is that there is no recognition of valid input pixels. For example, Table A shows that for the generation of output pixel $OP_3$, input pixel $IP_1$ should be passed directly through the system, as it is the exact value of the pixel occurring where the $OP_3$ pixel is output. However, due to the inherent imprecision in the accumulated α values, $OP_3$ would simply be generated in accordance with equation (2), adjusting the value of $P_{n+1}$ by essentially the total difference between $P_n$ and $P_{n+1}$. Hence, additional error is introduced by a magnification/reduction system that does not recognize when the input pixel signals are to be passed through unprocessed in order to generate valid output pixels. By recognizing these inherent problems, the present invention has been developed to accurately compensate for the accumulated error on a regular basis, so as to produce output pixels that are not only more accurate, but which recognize and utilize actual input pixels without modification, when appropriate. As an illustration, in the example shown by Table A, $OP_3$ would be determined as follows:

$$OP_3 = IP_1 + 0.111111111b\bullet(IP_0 - IP_1), \text{ or} \quad (3a)$$

$$OP_3 = IP_1 + 0.996\bullet(IP_0 - IP_1). \quad (3b)$$

On the other hand, the present invention would, in correcting for the problems inherent in the representation of binary fractions, determine $OP_3$ as follows:

$$OP_3 = IP_1 + 0.00000000b\bullet(IP_0 - IP_1), \text{ or} \quad (4a)$$

$$OP_3 = IP_1. \quad (4b)$$

The present invention obviously produces the more accurate interpolated output and is, therefore, a significant improvement in the technique used for scaling of digital images. Thus, the present invention provides an improved method for the generation of interpolated pixel data corresponding to pixel locations not defined within the original image array.

For a general understanding of an image processing hardware module incorporating the features of the present invention, reference is made to the drawings. In the drawings, like reference numerals have been used throughout to designate identical elements. FIG. 1 schematically depicts some of the possible components of a digital image processing hardware module, such as might be used in an electrophotographic system for the processing and analysis of a video signal prior to its output.

Referring now to FIG. 1, which illustrates a possible image processing module architecture which would suitably embody the present invention, image processing module 20 would generally receive offset and gain corrected video on input line 22. The video input data may be derived from a number of sources, including a raster input scanner, a graphics workstation, or electronic memory and similar storage elements. Moreover, the video input data in the present embodiment generally comprises 8-bit gray data, passed in a parallel fashion along the input data or video bus. Subsequently, module 20 would process the input video data according to control signals from CPU 24 to produce the output video signals on line 26. As illustrated, module 20 may include an optional segmentation block 30, which has an associated line buffer 32, two-dimensional filter 34, and an optional one-dimensional effects block, 36. Also included in module 20 is line buffer memory 38, comprising individual scanline buffers 42a-42e, for storing the context of incoming scanlines 1 through 5, respectively.

Segmentation block 30, in conjunction with associated scanline buffer 32, which provides at least one scanline of storage, is intended to parse the incoming video data to automatically determine those areas of the image which are representative of a halftone input region. Output from the segmentation block (Video Class) is used to implement subsequent image processing effects in accordance with the type or class of video signals identified by the segmentation block. For example, the segmentation block may identify a region containing data representative of an input halftone image, in which case a low pass filter would be used to remove screen patterns, otherwise, a remaining text portion of the input video image may be processed with an edge enhancement filter to improve fine line and character reproduction when thresholded. Further details of segmentation block 30 may be found in the pending U.S. patent application for "Improved Automatic Image Segmentation" (Ser. No. 07/722,568) by Shiau et al., or U.S. Pat. No. 4,811,115 to Lin et al. which teaches the use of an approximate auto-correlation function to determine the frequency of a halftone image area. One important aspect of incorporating the segmentation block in the image processing module is the requirement for a one scanline delay in video output. This requirement stems from the fact that the segmentation block needs to analyze the incoming line prior to determining the characteristics of the incoming video. Hence, the incoming corrected video is fed directly to segmentation block 30, while being delayed for subsequent use by two-dimensional filter 34, in line buffer memory 38.

Two-dimensional filter block 34, is intended to process the incoming, corrected video in accordance with a predetermined filtering selection. As illustrated by line buffer memory 38, up to a total of 5 scanlines of incoming video data may be used to establish the context upon which the two-dimensional filter is to operate. Subsequent to two-dimensional filtering, the optional one-dimensional effects block is used to alter the filtered, or possibly unfiltered, video data in accordance with selected one-dimensional video effects. One-dimensional video effects include, for example, thresholding, screening, inversion, tonal reproduction curve (TRC) adjustment, pixel masking, one-dimensional scaling, and other effects which may be applied to the stream of video signals in a one-dimensional or fast-scan orientation. As in the two-dimensional filter, the one-dimensional effects block also includes a bypass channel, where no additional effects would be applied to the video, thereby enabling the 8-bit filtered video to be passed through as output video.

Control of the various combinations of "effects" and filter treatments to be applied to the video stream is enacted by CPU 24. Through the establishment of window tiles, various processing methods can be controlled by directly writing to control memory, from which the operation of the image processing blocks is regulated. More specifically, independent portions of the incoming video stream, portions selectable on a pixel by pixel basis, are processed in accordance with predefined image processing parameters. The selection of the specific parameters may be accomplished by selectively programming the features prior to or during the processing of the video stream. Also, the features may be automatically selected as previously described with respect to image segmentation block 30. In general, CPU 24 is used to initially program the desired image processing features and parameters, as well as to update the feature selections during real-time processing of the video. Further details of the programming and selection of the image processing treatments is included in co-pending U.S. patent application "Method and Apparatus for Controlling the Processing of Digital Image Signals" by Williams et al. (Ser. No. 07/809,807). In an alternative embodiment the data for each pixel of image information may have an associated identifier or token to control the image processing operations performed thereon, as described in U.S. Pat. No. 4,897,803 to Calarco et al. (Issued Jan. 30, 1990).

Figure 2:
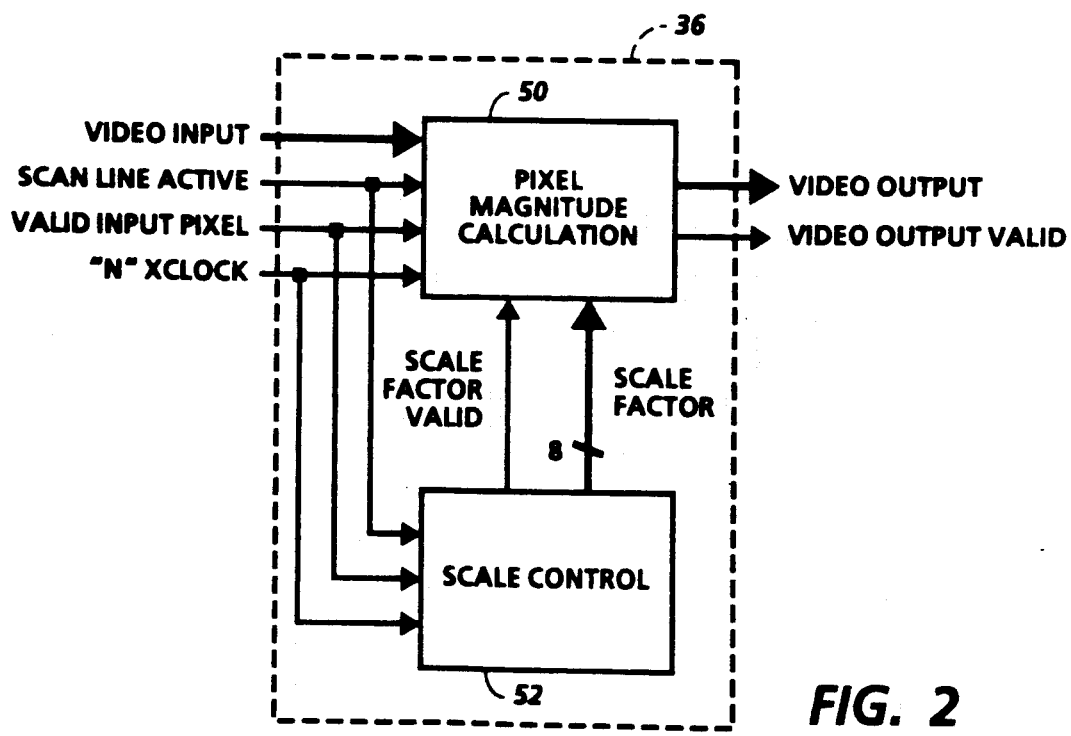
FIG. 2 is a general block diagram illustrating the two primary components of thee present invention, as they would be incorporated into the image processing hardware module of FIG. 1 to enable the scaling of a digital image.

Referring now to FIG. 2, which illustrates the two primary components of the present invention, pixel magnitude calculator 50 operates on the corrected and processed video received by 1-D block 36 from 2-D filter block 34. Along with the video or image pixel input, calculator 50 also receives synchronization signals, which are generally used to synchronize the operation of components on the video path, not only 1-D block 36, but also other components that may be included in image processing module 20. In addition, calculator 50 also receives a scale factor valid signal from scale control block 52. The scale factor valid signal is emitted from scale control block 52 whenever a valid scale factor is available on data lines 54, indicating that an interpolated pixel should be produced. In the illustrated embodiment, the scale factor passed from scale control block 52 to calculator 50 in an eight-bit fraction which represents the alpha ($\alpha$) value. Magnitude calculator 50 operates in a continuous fashion, constantly updating the level of the output pixel in accordance with the video input signals and the scale factor.

Figure 3A:
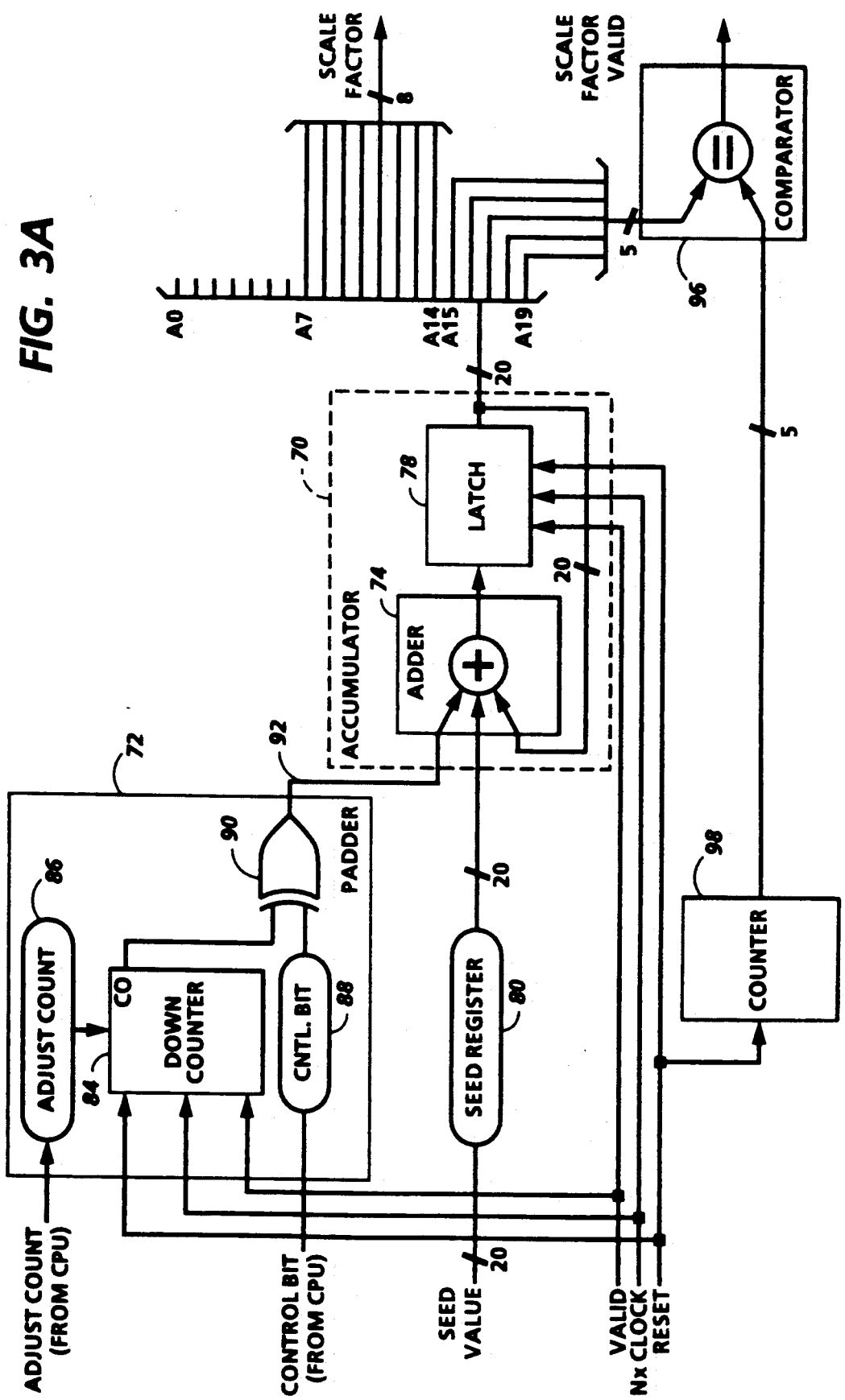
FIG. 3A is a hardware block diagram illustrating the hardware components used in the present invention for the implementation of the Scaling Control component of FIG. 2.
Figure 3B:
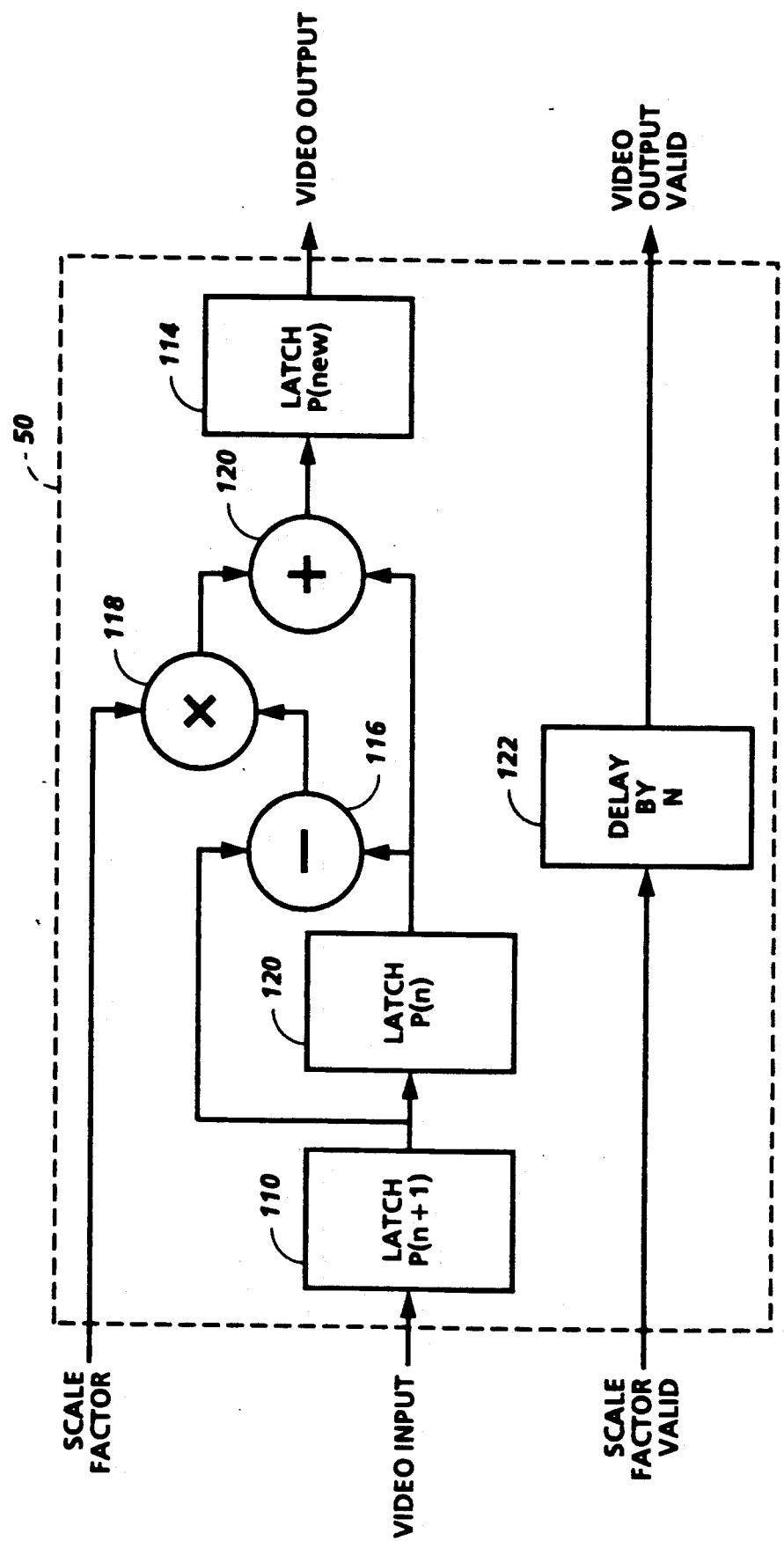
FIG. 3B is a hardware block diagram illustrating the hardware components used in the present invention for the implementation of the Pixel Magnitude Calculation component of FIG. 2.

FIGS. 3A and 3B illustrate in more detail the operations of scale control block 52 and magnitude calculator 50, respectively. Referring initially to FIG. 3A, where the operative components of the scale control block are illustrated in detail, along with FIGS. 4A and 4B, accumulator 70 is used to generate the scale factor as a function of the seed value and the output of padder 72, the 20-bit seed value being a binary representation of a 5-bit integer value and a 15-bit binary decimal value. In general, accumulator 70 adds, at adder 74, the previously accumulated seed values, as stored in latch 78, to the seed value input from register 80, along with the carry-in value output from padder 72. Portions of the output of accumulator 70 are subsequently used by the components remaining in the scale control block, or are passed to magnitude calculator 50 as the scale factor.

Figure 4A:
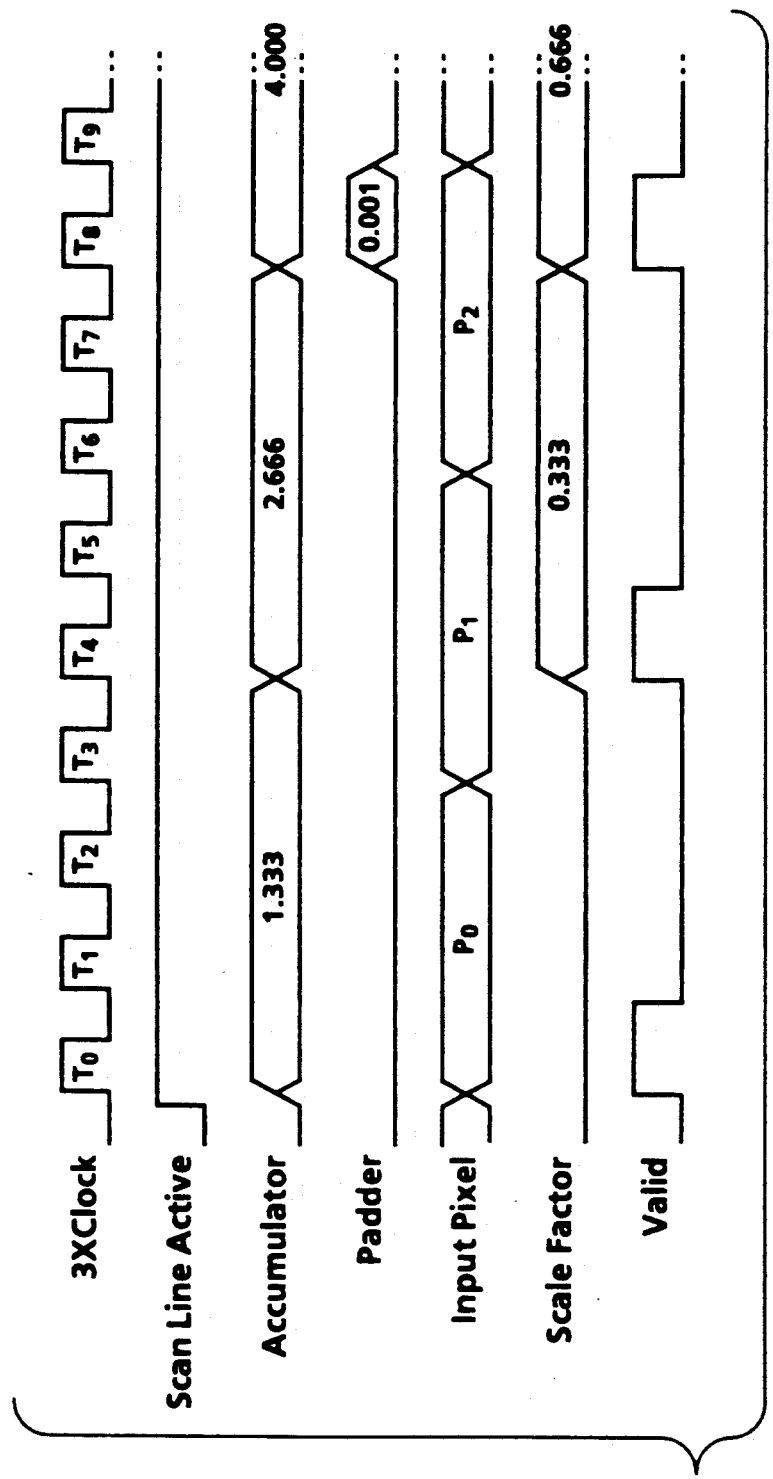
FIGS. 4A and 4B are representations of general timing diagrams illustrating the relationships between the signals shown in FIGS. 3A and 3B for two different scaling ratios.

Driving scale control block 52 are a set of three signals, Valid, NxClock, and Reset. The Reset signal is used to reinitialize the hardware within the scale control block at the beginning of each scanline of input data. The NxClock is a pulsed clocking signal used to synchronize various operations of the scale control block. In one embodiment, the NxClock is a clock that operates at three times the rate of the input data, or 3×. Thus, the 3×Clock signal shown in FIG. 4A is simply the implementation specific embodiment of the NxClock shown in FIG. 3A. Finally, the Valid signal is one which triggers various operations within the scale control block. A Valid signal pulse is generated whenever a valid output pixel is generated by the interpolation hardware of the present invention. The valid signal, in combination with the NxClock signal is used to increment the counters and set the latches within the scale control block, thereby synchronizing the output of the continuously running digital components contained therein.

Operation of scale control block 52 begins with the storage of the digital SeedValue in seed register 80, which maintains the seed value determined as a function of the desired scaling ratio. Once stored in register 80, the seed value is then available for subsequent accumulation in accumulator 70. Generally, the seed value is accumulated once for each output pixel to produce the scale factor ($\alpha$), which is output on accumulator lines $A_7$ through $A_{14}$. However, as previously described, generation of the seed value in this manner results in the introduction of error, due to the representation of fractional portion of the seed value in a binary format. Hence, padder 72 is used to supplement, or pad, the accumulated value with a known bit stream to overcome the limitations of the binary fractions. Simply put, the padder outputs a signal to the accumulator in a specific pattern, to account for the problems inherent in binary fractions, thereby causing the accumulated sums to more accurately represent the fractional values intended.

In the present embodiment, padder 72 consists of resettable down-counter 84, count register 86, control-bit latch 88, and XOR gate 90. Down-counter 84 is decremented once for each valid input pixel, and thereby produces an active output on its carry-out (CO) pin whenever the count equals zero. Moreover, when the count reaches zero, the value in count register 86 is used to reload the down-counter. The carry-out signal from down-counter 84 is combined with the latched control-bit signal at XOR gate 90 to produce the padder output on line 92. Thus, depending on the state of the control-bit, as loaded by CPU 24 of FIG. 1, padder 72 will output a bit-stream that reflects the output of the down-counter's carry-out (CO) pin, or its inverse. The signal placed upon line 92 is generated in accordance with a pattern necessary to supplement the accumulated scale factor, which is accomplished by the input of the padder signal to the carry-in pin of adder 74. The pattern is generally determined as a function of the magnitude of the fractional portion of the seed value. For example, the following pseudo-code could be used to generate the required down-counter reload value, and the control-bit value:

--- if the fractional portion is < 1/8,
    then reload value = 0, and control-bit = 0;
elseif the fractional portion is < 1/7,
    then reload value = 7, and control-bit = 1;
elseif the fractional portion is < 1/6,
    then reload value = 6, and control-bit = 1;

```
    elseif the fractional portion is < 1/5,
        then reload value = 5, and control-bit = 1;
    elseif the fractional portion is < 1/4,
        then reload value = 4, and control-bit = 1;
    elseif the fractional portion is < 1/3,
        then reload value = 3, and control-bit = 1;
    elseif the fractional portion is < 1/2,
        then reload value = 2, and control-bit = 1;
    elseif the fractional portion is < 2/3,
        then reload value = 1, and control-bit = 0;
    elseif the fractional portion is < 3/4,
        then reload value = 2, and control-bit = 0;
    elseif the fractional portion is < 4/5,
        then reload value = 3, and control-bit = 0;
    elseif the fractional portion is < 5/6,
        then reload value = 4, and control-bit = 0;
    elseif the fractional portion is < 6/7,
        then reload value = 5, and control-bit = 0;
    elseif the fractional portion is < 7/8,
        then reload value = 6, and control-bit = 0;
    elseif reload value = 7, and control-bit = 0
```

Hence, the padder output supplements the accumulated value in accordance with the seed fraction so that the value latched and subsequently output from accumulator 70 accurately represents what the actual accumulated seed value would be.

Subsequent to accumulation, the output of accumulator 70 is split and the five most significant bits of data, $A_{15}$ through $A_{19}$, are used by comparator 96 to determine if the scale factor contained on lines $A_7$ through $A_{14}$ is a valid scale factor. Comparator 96 compares the upper five bits of the accumulator output, which represents the integer portion of the seed value, with the value of pixel counter 98. Thus, comparator 96 produces an active scale factor valid signal whenever the incoming pixel count is equal to the integer portion of the accumulated seed value.

A typical operating sequence is displayed in Table B, where examples of the digital signal data for the scale control block are illustrated, encompassing the input of a series of pixels and subsequent scale factor generation for the output pixels based thereon. Along the left side of Table B is the input pixel number, showing pixels $P_0$ through $P_9$. The next column, clock cycle, illustrates the corresponding cycle number for the 3×Clock signal, as represented in the timing diagram of FIG. 4A. The example illustrated in Table B assumes that the input data will be used to generate an output image at a seventy-five percent reduction. Carrying out the conversion, the seventy-five percent reduction generates a seed value of 1.3333. Moreover, in order to correct or supplement the accumulation of the seed value, the padder down-counter will utilize a preload count of two and a control-bit value of 0, resulting in a repeating bit pattern of [1,1,0,1,1,0, ... ]. Finally, due to the requirement for initialization of the hardware, the present embodiment always outputs the first pixel, $P_0$, without interpolation.

Following through Table B, and the similar representation of the signals in FIG. 4A, it is apparent that subsequent to recognizing the first pixel, where the initial scale factor is 00h, the seed value is accumulated, or added, along with the padder output, thereby producing a value of 0AAABh in the accumulator. The next time that accumulator bits $A_{15}$ through $A_{19}$ match the number of the input pixel, which occurs during clock cycle 3, the scale factor valid signal is generated and the scale factor, 55h (bits $A_7$–$A_{14}$) is passed to the magnitude calculator for generation of output pixel number one on the subsequent clock cycle. Subsequently, the seed value and output of the padder are again accumulated to produce the next scale factor and comparison values ($A_{15}$–$A_{19}$). As illustrated in Table B, the subsequent accumulation produces the accumulated value of 11557h. When the comparison values again match the input pixel counter value, the process will repeat, outputting a scale factor valid signal and reaccumulating by adding new seed and padder values. Operation of the scale factor block continues in this manner until a reset signal is received to reinitialize the hardware. As illustrated by the data in Table B, the actual input pixel, for example input pixel $P_4$, will be processed with a zeroed scale factor to allow the signal to pass through magnitude calculator 50 without modification. Thus, Table B illustrates the general operation of the scale control block, indicating the accumulation and padding of the seed value, as well as, the generation of the scale factor and scale factor valid signals.

Referring next to FIG. 3B, which shows the details of magnitude calculator 50, the input pixel signals, $P_{n+1}$ and $P_n$, are successively latched at latches 110 and 112, respectively. Latch 112, containing signal $P_n$ is the oldest of the two signals stored by calculator 50, while latch 110 contains the most recent signal received. As previously indicated with respect to equation (2), the latched values are used to calculate the value of output pixel, $P_{new}$, which will be generated by the digital circuitry in magnitude calculator 50, and stored in output latch 114. Generation of the output value is accomplished by first determining the magnitude of the difference between the two input pixel signals at subtracter 116. The output of the subtracter, $(P_n - P_{n+1})$, is passed to multiplier 118, where it is multiplied by the scale factor, $\alpha$, output from scale control block 52. Subsequently, the product generated at multiplier 118, $\alpha \bullet (P_n - P_{n+1})$, is passed to adder 120, where it is combined with $P_n$ to produce the sum, $P_n + \alpha \bullet (P_n - P_{n+1})$, which is the new value to be used for the output pixel, $P_{new}$. Hence, $P_{new}$ will be temporarily stored in latch 114, where it will be available as output video upon the rising edge of the next Video Output Valid signal, which is itself derived from the Scale Factor Valid signal provided by scale control block 52. Generally, the Video Output Valid signal is generated by delaying the Scale Factor Valid signal in delay block 122 so as to keep the final output of adder 120, as stored in latch 114, in synchronization. Without such a synchronizing signal, it would be difficult to determine when to latch and output the new pixel value generated by the free-running magnitude calculator hardware.

Figure 4B:
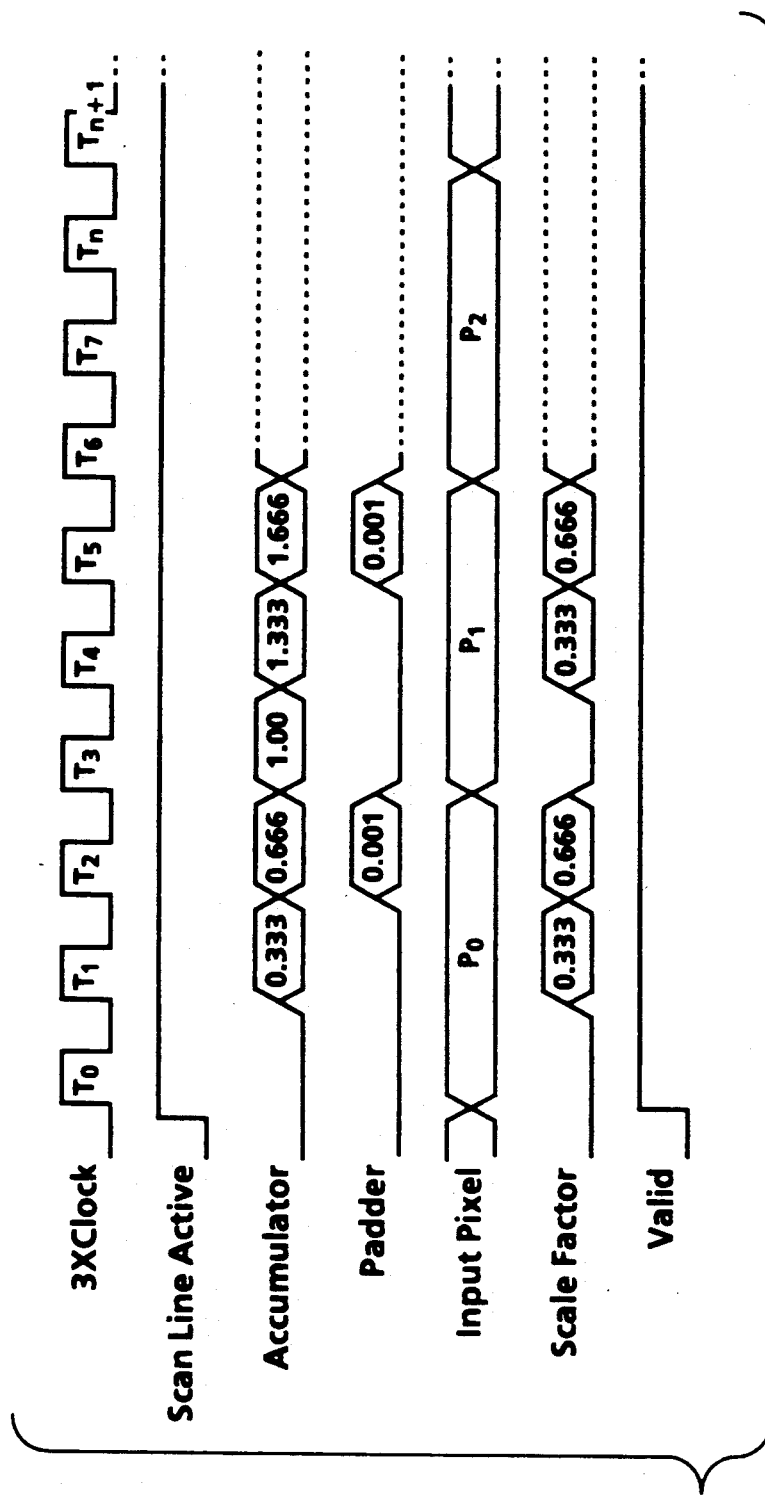

As a further example of the operation of the system, FIGS. 4A and 4B illustrate the relative timing diagrams for two possible scaling configurations, FIG. 4A having been previously described with respect to the illustration of Table B. Similarly, FIG. 4B is an illustrative example of the operation of the system when the image is to be magnified by three-hundred percent. In this case, the seed value would be one-third, and the value of the scale factor, $\alpha$, would be 0.333d (2AAAh). Once again, padder 72 would be preprogrammed and, in this example, it would output an active carry-out signal on every third clock cycle, to assure that the accumulated scale factor value identifies every third output pixel as being equivalent to the unmodified input pixel. As indicated by the timing diagram, the present embodiment is limited to a maximum of 300% magnification due to the frequency of the 3×Clock. However, it would be possible to increase this magnification range by either suitably increasing the clock frequency, or possibly reducing the rate of the incoming pixel data.

In the alternative embodiment illustrated in FIG. 5, the present invention may be used to provide synchronization signals and scale factors for the interpolation of scanlines of image data, as well as, individual pixels. In such an embodiment, the two-dimensional scaling would be accomplished by a pair of interpolation operations, one acting on complete scanlines, the other on individual pixels within the scanlines. This alternative embodiment would require video memory sufficient for the storage of at least two scanlines of input video signals, 200a,b and at least one scanline of output video signals, memory 202. However, while such an embodiment may require multiple interpolation operations to determine interpolated scanlines in one direction via scanline calculator block 204, and interpolated pixels in another via pixel calculator block 206, it is entirely possible for such a system to be implemented with only a single scale control block, 208.

In a manner similar to that previously described with respect to the interpolation of the individual pixel signals, the video scanlines may be scaled using a Scanline Scale Factor Valid signal to select the scanlines for interpolation, and a Scanline Scale Factor to carry out the calculation of the interpolated pixel values for all locations along the scanline, as illustrated by scanline calculator block 202, thereby producing a complete scanline of pixels where the scanline represents the scaled output in a slow-scan direction. Subsequent to determining the values of all pixels in the interpolated scanline and storing them in scanline memory 202, the individual pixel values are passed to pixel magnitude calculator 206 and processed as previously described to produce output video which has been scaled in two dimensions.

The hardware necessary to generate the scale factors and scanline or pixel valid signals is contained within scale control block 208. Generally, this block operates as has been previously described, but, with the modification that both the inputs and outputs of accumulator 212 are multiplexed to allow for swapping between the generation of scaling output for the scanlines and the scaling output for the pixels. In some scanning systems, there is a slight delay between when the last pixel of a scanline is output and when the first pixel of the succeeding scanline is output. It is the intent of this embodiment to utilize that interline "dead time" to update the scanline scaling information using the same hardware that is used to generate the pixel scaling information. By multiplexing the inputs and outputs of an accumulator similar to that hereinbefore described, accumulator 212 can be used to produce the required dual scale control outputs.

Within scale control block 208, a pair of padder circuits, 214p and 214s are employed to generate the padder output for accumulator 212, for the pixel and scanline accumulations, respectively. Once again, padders 214p and 214s operate in the manner previously described with respect to the one dimensional implementation, where the output of 214p is dependent upon the number of output pixels processed within a scanline and the output of 214s is dependent upon the number of output scanlines processed within the image. Subsequently, the output from the padders would be multiplexed in MUX 216 which would control which of the padder output values was being passed to adder 218. Throughout scale control block 208, a select signal is used to control the selection of input values and the latching of output values, in accordance with the generation of a scanline or pixel scale factor.

Adder 218 accumulates the seed value which is common to both the fast-scan and slow-scan scaleing operations, the output of one of the padders, 214p or 214s and the respective accumulator latch, 222p or 222s, as controlled by MUX 224. Once a sum is generated by adder 218, the output is latched in one of the two latches, 222p or 222s where the values are available for subsequent use. As previously described, the output values contained in latches 222p and 222s are split into fractional scale factors which are passed to the respective calculators, and into integer values. The integer values of latches 222p and 222s are compared against the pixel and scanline counts contained in counters 224p and 2224s, respectively. The comparisons, carried out in comparators 226p and 226s, result in the generation of the pixel valid and scanline valid signals when appropriate. Hence, a modified scale control block may be used to control the generation of scale factors and synchronization signals necessary for scaling an image in two dimensions.

Yet another alternative may employ a pair of interpolated scanline memories at memory 202 to allow the generation and storage of a scaled scanline in a first scanline memory, while using a second scanline memory to generate the scaled pixel or video output. Once the pixels in the second scanline memory have been exhausted, and the first memory is filled, the first and second memories would be swapped to allow a new scaled scanline to be input into the second memory and individual pixels to be read out of the first memory. This embodiment would result in an improved video throughput rate for the two-dimensional scaling apparatus described in FIG. 5.

In addition, it should also be noted that the present invention is not intended to be limited to any of the embodiments described herein, and may include alternative arrangements of the elements of the present invention to accomplish either one or two-dimensional interpolated scaling. For example, the above described two-dimensional embodiment may not be suitable for the implementation of anamorphic scaling without minor modifications to enable a second value to be utilized, yet such a modification is intended to be well within the scope of the present invention.

In recapitulation, the present invention implements an interpolation process suitable for the real-time scaling or interpolation of digital images while producing highly accurate results. The apparatus further includes the ability to recognize limitations in the digital representation of fractional numbers and suitably pads the accumulated scale factor when necessary, to overcome this limitation. Moreover, the precision and speed of the present invention are achieved without the need for storing large blocks of interpolation data.

It is, therefore, apparent that there has been provided in accordance with the present invention, an apparatus employing a novel interpolation method to produce scaled image data coincident with the processing thereof, thereby fully satisfying the aims and advantages hereinbefore set forth. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

TABLE B

| INPUT PIXEL | CLCK. CYCLE | PADDER DOWN COUNT | PADDER OUTPUT | N-BIT INPUT PIXEL COUNTER | ACCUMULATOR LATCH DATA | | | | | | | | | | | | | | | | | | | | SCALE FACTOR VALID | 8-BIT SCALE FACTOR (hex) | OUTPUT PIXEL NO. |
|---|---|---|---|---|---|---|---|---|---|---|---|---|---|---|---|---|---|---|---|---|---|---|---|---|---|---|---|
| | | | | | 19 | 18 | 17 | 16 | 15 | 14 | 13 | 12 | 11 | 10 | 09 | 08 | 07 | 06 | 05 | 04 | 03 | 02 | 01 | 00 | | | |
| — | — | — | — | RESET | 0 | 0 | 0 | 0 | 0 | 0 | 0 | 0 | 0 | 0 | 0 | 0 | 0 | 0 | 0 | 0 | 0 | 0 | 0 | 0 | 0 | — | — |
| $P_0$ | 0 | 2 | +1 | 00000 | 0 | 0 | 0 | 0 | 1 | 1 | 1 | 1 | 1 | 1 | 1 | 1 | 1 | 1 | 1 | 1 | 1 | 1 | 1 | 1 | 1 | 00h | 0 |
| $P_0$ | 1 | 1 | −1 | 00000 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 |
| $P_0$ | 2 | 1 | −1 | 00000 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 |
| $P_1$ | 3 | 1 | −1 | 00001 | 0 | 0 | 0 | 0 | 0 | 1 | 1 | 1 | 1 | 1 | 1 | 1 | 1 | 1 | 1 | 1 | 1 | 1 | 1 | 1 | 0 | | 0 |
| $P_1$ | 4 | 2 | +1 | 00001 | 0 | 0 | 0 | 0 | 1 | 0 | 0 | 0 | 0 | 0 | 0 | 0 | 0 | 0 | 0 | 0 | 0 | 0 | 0 | 0 | 1 | 55h | 1 |
| $P_1$ | 5 | 1 | −1 | 00001 | 0 | 0 | 0 | 0 | 0 | 1 | 1 | 1 | 1 | 1 | 1 | 1 | 1 | 1 | 1 | 1 | 1 | 1 | 1 | 1 | 0 | | 1 |
| $P_2$ | 6 | 1 | −1 | 00010 | 0 | 0 | 0 | 0 | 0 | 1 | 1 | 1 | 1 | 1 | 1 | 1 | 1 | 1 | 1 | 1 | 1 | 1 | 1 | 0 | 0 | | 1 |
| $P_2$ | 7 | 0 | +0 | 00010 | 0 | 0 | 0 | 0 | 0 | 1 | 1 | 1 | 1 | 1 | 1 | 1 | 1 | 1 | 1 | 1 | 1 | 1 | 1 | 0 | 1 | AAh | 2 |
| $P_2$ | 8 | 2 | 0 | 00010 | 0 | 0 | 0 | 0 | 0 | 1 | 1 | 1 | 1 | 1 | 1 | 1 | 1 | 1 | 1 | 1 | 1 | 1 | 1 | 0 | 0 | | 2 |
| $P_3$ | 9 | 2 | 0 | 00010 | 0 | 0 | 0 | 0 | 0 | 1 | 1 | 1 | 1 | 1 | 1 | 1 | 1 | 1 | 1 | 1 | 1 | 1 | 1 | 0 | 0 | | 2 |
| $P_3$ | 10 | 2 | 0 | 00011 | 0 | 0 | 0 | 0 | 0 | 1 | 1 | 1 | 1 | 1 | 1 | 1 | 1 | 1 | 1 | 1 | 1 | 1 | 0 | 0 | 0 | | 2 |
| $P_3$ | 11 | 2 | 0 | 00011 | 0 | 0 | 0 | 0 | 0 | 1 | 1 | 1 | 1 | 1 | 1 | 1 | 1 | 1 | 1 | 1 | 1 | 1 | 0 | 0 | 0 | | 2 |
| $P_4$ | 12 | 2 | 0 | 00100 | 0 | 0 | 0 | 0 | 0 | 1 | 1 | 1 | 1 | 1 | 1 | 1 | 1 | 1 | 1 | 1 | 1 | 0 | 0 | 0 | 0 | | 2 |
| $P_4$ | 13 | 2 | +1 | 00100 | 0 | 0 | 0 | 0 | 1 | 0 | 0 | 0 | 0 | 0 | 0 | 0 | 0 | 0 | 0 | 0 | 0 | 1 | 1 | 1 | 1 | 00h | 3 |
| $P_4$ | 14 | 1 | −1 | 00100 | 0 | 0 | 0 | 0 | 0 | 1 | 1 | 1 | 1 | 1 | 1 | 1 | 1 | 1 | 1 | 1 | 1 | 0 | 0 | 0 | 0 | | 3 |
| $P_5$ | 15 | 1 | −1 | 00101 | 0 | 0 | 0 | 0 | 0 | 1 | 1 | 1 | 1 | 1 | 1 | 1 | 1 | 1 | 1 | 1 | 0 | 0 | 0 | 0 | 0 | | 3 |
| $P_5$ | 16 | 1 | +1 | 00101 | 0 | 0 | 0 | 0 | 1 | 0 | 0 | 0 | 0 | 0 | 0 | 0 | 0 | 0 | 0 | 0 | 1 | 1 | 1 | 1 | 1 | 55h | 4 |
| $P_5$ | 17 | 0 | −1 | 00101 | 0 | 0 | 0 | 0 | 0 | 1 | 1 | 1 | 1 | 1 | 1 | 1 | 1 | 1 | 1 | 1 | 0 | 0 | 0 | 0 | 0 | | 4 |
| $P_6$ | 18 | 0 | +0 | 00110 | 0 | 0 | 0 | 0 | 0 | 1 | 1 | 1 | 1 | 1 | 1 | 1 | 1 | 1 | 1 | 0 | 0 | 0 | 0 | 0 | 1 | AAh | 4 |
| $P_6$ | 19 | 2 | 0 | 00110 | 0 | 0 | 0 | 0 | 0 | 1 | 1 | 1 | 1 | 1 | 1 | 1 | 1 | 1 | 1 | 0 | 0 | 0 | 0 | 0 | 0 | | 5 |
| $P_7$ | 20 | 2 | 0 | 00110 | 0 | 0 | 0 | 0 | 0 | 1 | 1 | 1 | 1 | 1 | 1 | 1 | 1 | 1 | 1 | 0 | 0 | 0 | 0 | 0 | 0 | | 5 |
| $P_7$ | 21 | 2 | 0 | 00111 | 0 | 0 | 0 | 0 | 0 | 1 | 1 | 1 | 1 | 1 | 1 | 1 | 1 | 1 | 0 | 0 | 0 | 0 | 0 | 0 | 0 | | 5 |
| $P_7$ | 22 | 2 | 0 | 00111 | 0 | 0 | 0 | 0 | 0 | 1 | 1 | 1 | 1 | 1 | 1 | 1 | 1 | 1 | 0 | 0 | 0 | 0 | 0 | 0 | 0 | | 5 |
| $P_8$ | 23 | 2 | 0 | 00111 | 0 | 0 | 0 | 0 | 0 | 1 | 1 | 1 | 1 | 1 | 1 | 1 | 1 | 0 | 0 | 0 | 0 | 0 | 0 | 0 | 0 | | 5 |
| $P_8$ | 24 | 2 | +1 | 01000 | 0 | 0 | 0 | 0 | 1 | 0 | 0 | 0 | 0 | 0 | 0 | 0 | 0 | 1 | 1 | 1 | 1 | 1 | 1 | 1 | 1 | 00h | 6 |
| $P_8$ | 25 | 2 | −1 | 01000 | 0 | 0 | 0 | 0 | 0 | 1 | 1 | 1 | 1 | 1 | 1 | 1 | 1 | 0 | 0 | 0 | 0 | 0 | 0 | 0 | 0 | | 6 |
| $P_9$ | 26 | 1 | −1 | 01000 | 0 | 0 | 0 | 0 | 0 | 1 | 1 | 1 | 1 | 1 | 1 | 1 | 1 | 0 | 0 | 0 | 0 | 0 | 0 | 0 | 0 | | 6 |
| $P_9$ | 27 | 1 | −1 | 01000 | 0 | 0 | 0 | 0 | 0 | 1 | 1 | 1 | 1 | 1 | 1 | 1 | 0 | 0 | 0 | 0 | 0 | 0 | 0 | 0 | 0 | | 6 |

I claim:

1. An image processing system for scaling the size of an image represented by a plurality of input video signals, by a desired scaling ratio, so as to represent the image with a plurality of output video signals different in number than the input video signals, comprising:

control means for producing a scale factor and a scale factor valid signal, said control means including padding means suitable for increasing the accuracy of the scale factor during continuous operation of said control means; and video signal magnitude calculating means, responsive to the scale factor and scale factor valid signal from said control means, for producing an output video signal as a function of at least one input video signal.

2. The image processing system of claim 1, wherein the control means comprises:

a data latch;

an accumulator for adding a seed value, the value of the data stored in the latch, and an output from the padding means to produce a sum having an integer and a fractional portion, said sum being stored in the latch; and means for comparing the sum stored in the latch against the output of a counter, and thereby generating the valid signal whenever the counter output and the integer portion of the latched sum are equivalent.

3. The image processing system of claim 2, wherein the padding means comprises means for providing a repeating stream of binary signals to be input to said accumulator so as to increase the accuracy of the accumulated sum, said stream of binary signals being defined as a function of the seed value.

4. The image processing system of claim 3, wherein said providing means comprises:

a resettable down-counter responsive to the valid signal, said down-counter decrementing a count contained therein upon detection of said valid signal, said down-counter producing an active carry-out signal and reloading with a predetermined value whenever the count reaches zero; and means for modifying the level of said carry-out signal such that the modified signal output by said modifying means is a repeating series of binary digits having a period equal to the period of said down-counter, thereby providing said repeating series of binary signals to the accumulator to increase the accuracy of the accumulated sum.

5. An image scaling apparatus employing an interpolative technique for scaling the size of a digital image, comprising:

a scale controller for producing at least one fractional scale factor and at least one synchronization signal, said scale controller including at least one padder suitable for improving the accuracy of the fractional scale factor during the operation of said scale controller; and at least one video signal magnitude calculating means, responsive to said synchronization signal, for producing output video signals as a function of said fractional scale factor and at least one input video signal.

6. The image scaling apparatus of claim 5, wherein the scale controller comprises:

at least one data latch;

an accumulator for summing a seed value, a data value stored in the latch, and a value output by the padder to produce a sum having an integer and a fractional portion, said sum being stored in the latch; and means for comparing the sum stored in the latch against the output of at least one counter, and thereby generating the synchronization signal whenever the counter output and the integer portion of the latched sum are equal.

7. The image scaling apparatus of claim 6, wherein the padder comprises means for generating a repeating stream of binary signals to be input to the accumulator so as to supplement the accumulated sum and thereby improve the accuracy of the accumulated sum, said stream of binary signals being generated as a function of the seed value.

8. The image scaling apparatus of claim 7, wherein the generating means comprises:

a reloadable down-counter responsive to the synchronization signal, said down-counter decrementing a count contained therein upon detection of said synchronization signal, said down-counter producing an active carry-out signal and reloading with a predetermined value whenever the count reaches zero; and means for selectively modifying the level of said carry-out signal to generate a repeating series of binary signals, wherein the series of binary signals has a period equal to the period of said down-counter.

9. A method of scaling an input image represented by a plurality of pixel values to produce an output image having an increased or a decreased number of pixel values comprising the steps of:

(a) receiving a seed value generated as a function of a desired scaling ratio;

(b) obtaining a first input pixel value and storing the first pixel value in memory as $P_n$;

(c) obtaining a second input pixel value and storing the second pixel value in memory as $P_{n+1}$;

(d) accumulating a sum using the seed value and a supplemental value, whereby the accumulated sum has both an integer portion and a fractional portion;

(e) storing the accumulated sum for subsequent use;

(f) generating a scale factor, $\alpha$, as a function of the fractional portion of the accumulated sum;

(g) determining, based upon the integer portion of the accumulated sum, whether the first and second input pixel values are to be used to produce an output pixel, and if not, continuing at step (i); otherwise (h) interpolating, using the scale factor, between the first and the second pixels to produce an output pixel value $P_{new}$, where $P_{new} = P_{n+1} + \alpha(P_n - P_{n+1})$, and then continuing at step (d);

(i) shifting the second pixel value to the memory location used for storing the first pixel value, thereby establishing the second pixel value as the new value for $P_n$; and (j) repeating the above steps beginning at step (c) until all input pixels have been exhausted.

10. The method of claim 9, wherein the step of accumulating a sum further comprises the step of generating a repeating pattern of binary output values to be used as the supplemental value, whereby the repeating pattern is a function of the seed value, and whereby the value of the supplemental value at any time is a function of both the repeating pattern and the number of output pixels produced.

11. The method of claim 10, wherein the step of generating a repeating pattern of binary output values comprises the steps of:
   determining, as a function of the fractional portion of the seed value, a binary pattern and the period of said pattern;
   loading a down-counter with the period; and
   generating the repeating pattern of binary values in response to a carry-out output of the down-counter so as to invert the state of the output whenever the down-counter reaches a zero value.

12. The method of claim 11, further including the step of reloading the down-counter with the period whenever the down-counter reaches zero.

13. An image interpolation apparatus for generating new pixels at previously undefined pixel locations, for an array of input image pixels, comprising:
   control means for producing at least one interpolation factor and an interpolation factor valid signal, said control means including padding means suitable for increasing the accuracy of the scale factor during continuous operation of said control means; and
   new pixel magnitude calculating means, responsive to the interpolation factor and interpolation factor valid signal from said control means, for producing a new pixel as a function of at least one input pixel.

14. The image interpolation apparatus of claim 13, wherein said control means comprises:
   a data latch suitable for storing a value therein;
   counting means for maintaining a value representative of the number of input pixels received;
   an accumulator for adding a seed value, the value of the data stored in the latch, and an output from the padding means to produce a sum having an integer and a fractional portion, wherein the sum is subsequently stored in the latch;
   means for comparing the sum stored in the latch against the value maintained by the counting means and generating the valid signal whenever the value and the integer portion of the sum are equivalent.

15. The image interpolation apparatus of claim 14, wherein the padding means comprises means for providing a repeating stream of binary signals to be input to said accumulator so as to increase the accuracy of the accumulated sum, said stream of binary signals being defined as a function of the seed value.

16. The image interpolation apparatus of claim 15, wherein said providing means comprises:
   a resettable down-counter responsive to the interpolation factor valid signal, said down-counter decrementing a count contained therein upon detection of said valid signal, said down-counter further producing an active carry-out signal and reloading with a predetermined value whenever the counter reaches zero;
   means for modifying the level of said carry-out signal such that the modified signal output by said modifying means is a repeating series of binary digits having a period equal to the period of said down-counter, thereby providing the repeating series of binary signals to the accumulator to increase the accuracy of the accumulated sum.

* * * * *